United States Patent
Diaz et al.

(10) Patent No.: US 8,238,243 B2
(45) Date of Patent: Aug. 7, 2012

(54) SYSTEM AND METHOD FOR NETWORK OPTIMIZATION BY MANAGING LOW PRIORITY DATA TRANSFERS

(75) Inventors: Raul Diaz, Palo Alto, CA (US); Ron Mayer, Newark, CA (US)

(73) Assignee: ArcSoft, Inc., Fremont, CA (US)

( * ) Notice: Subject to any disclaimer, the term of this patent is extended or adjusted under 35 U.S.C. 154(b) by 0 days.

(21) Appl. No.: 12/370,328

(22) Filed: Feb. 12, 2009

(65) Prior Publication Data
US 2010/0202287 A1    Aug. 12, 2010

(51) Int. Cl.
*H04L 12/26* (2006.01)
(52) U.S. Cl. ........ 370/232; 370/235; 370/428; 709/224; 709/225; 709/234
(58) Field of Classification Search ............... None
See application file for complete search history.

(56) References Cited

U.S. PATENT DOCUMENTS

| | | | | |
|---|---|---|---|---|
| 5,790,536 | A * | 8/1998 | Mahany et al. | 370/428 |
| 6,442,603 | B1 * | 8/2002 | Borella | 370/428 |
| 6,675,212 | B1 * | 1/2004 | Greenwood | 709/224 |
| 6,678,252 | B1 | 1/2004 | Cansever | |
| 7,480,707 | B2 * | 1/2009 | Morlitz | 709/224 |
| 7,577,949 | B2 | 8/2009 | Barr et al. | |
| 2001/0021942 | A1 * | 9/2001 | De Bot et al. | 709/235 |
| 2002/0198991 | A1 | 12/2002 | Gopalakrishnan et al. | |
| 2003/0110293 | A1 * | 6/2003 | Friedman et al. | 709/225 |
| 2005/0243862 | A1 * | 11/2005 | Krishnan | 370/252 |
| 2006/0002532 | A1 | 1/2006 | Horvitz et al. | |
| 2006/0129670 | A1 | 6/2006 | Mayer | |
| 2007/0124464 | A1 | 5/2007 | Lean et al. | |
| 2007/0177625 | A1 | 8/2007 | Morinaga et al. | |
| 2008/0031136 | A1 | 2/2008 | Gavette et al. | |
| 2009/0077233 | A1 * | 3/2009 | Kurebayashi et al. | 709/224 |
| 2009/0271577 | A1 | 10/2009 | Campana et al. | |
| 2009/0310485 | A1 | 12/2009 | Averi et al. | |
| 2010/0205292 | A1 * | 8/2010 | Diaz | 709/224 |

* cited by examiner

*Primary Examiner* — Jeffrey M Rutkowski
(74) *Attorney, Agent, or Firm* — Liaoteng Wang (57) ABSTRACT

As more internet service providers have more customers with high-speed internet access accounts and these customers access more multi-media rich data (such as videos), the network infrastructure of internet service providers becomes saturated. Thus, internet service providers are facing pressure to upgrade their networks. However, high-speed digital networking equipment is expensive. Thus, internet service providers need to optimize the usage of their existing networks. To optimize the usage of existing networks, a system of delaying certain data requests is proposed. By delaying certain data requests, the various components in a network can shift data transfers from peak traffic times to lower traffic times. One useful application of delayed requests is the case in which a web client requests data ahead of schedule either through predictive methods or through subscriptions for desired data.

20 Claims, 4 Drawing Sheets

SYSTEM AND METHOD FOR NETWORK OPTIMIZATION BY MANAGING LOW PRIORITY DATA TRANSFERS

RELATED APPLICATIONS

The present patent application is related to the patent application titled "SYSTEM AND METHOD FOR NETWORK OPTIMIZATION THROUGH PREDICTIVE DOWNLOADING" having Ser. No. 12/370,462 filed concurrently with this application and hereby incorporates it by reference in its entirety.

TECHNICAL FIELD

The present invention relates to the field of digital communication networks. In particular, but not by way of limitation, the present invention discloses techniques optimizing the network usage through the management of low priority transfers.

BACKGROUND

The global internet has become a standard telecommunication system in modern life. The internet provides communication means such as email, voice over internet protocol (VOIP) telephony, and video conferencing. The internet acts as a mass media communication network by offering a wide variety of media such as news websites, entertainment websites, downloadable music and video. The internet also offers services such as investment services, banking, computer services, and internet gaming. The internet even provides a convenient means of obtaining physical products through the use of online merchants and auction sites.

Most homes and businesses in the United States of America now have some form of internet access. Initially, most homes relied upon relatively slow dial-up analog modem lines to access the internet. But more recently, higher speed internet access provided by digital subscriber lines (DSL), cable modems, or wireless network connections is becoming increasingly common. These higher speed forms of internet access allow homes and businesses to access rich multi-media web sites that include images, audio, and video.

As users are increasingly accessing greater amounts of information by downloading data-intensive items such as video, internet service providers (ISPs) are being pressured to upgrade their data networks in order to handle these rapidly growing data demands. The high costs of upgrading data networks can greatly affect the profit margins of internet service providers. This is especially true when the internet service providers are being pressured to increase data network capacity without receiving greater revenues in the form of internet access subscriber fees. Thus, internet service providers have a great incentive to optimize the usage of their existing data network investment such that internet subscribers continue to receive high-quality service and data network upgrades can be deferred.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to an internet service provider, the teachings can be used in many other environments. For example, a cellular telephone network service provider may use the teachings of the present disclosure to optimize data transfers on a cellular telephone network. The example embodiments may be combined, other embodiments may be utilized, or structural, logical and electrical changes may be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
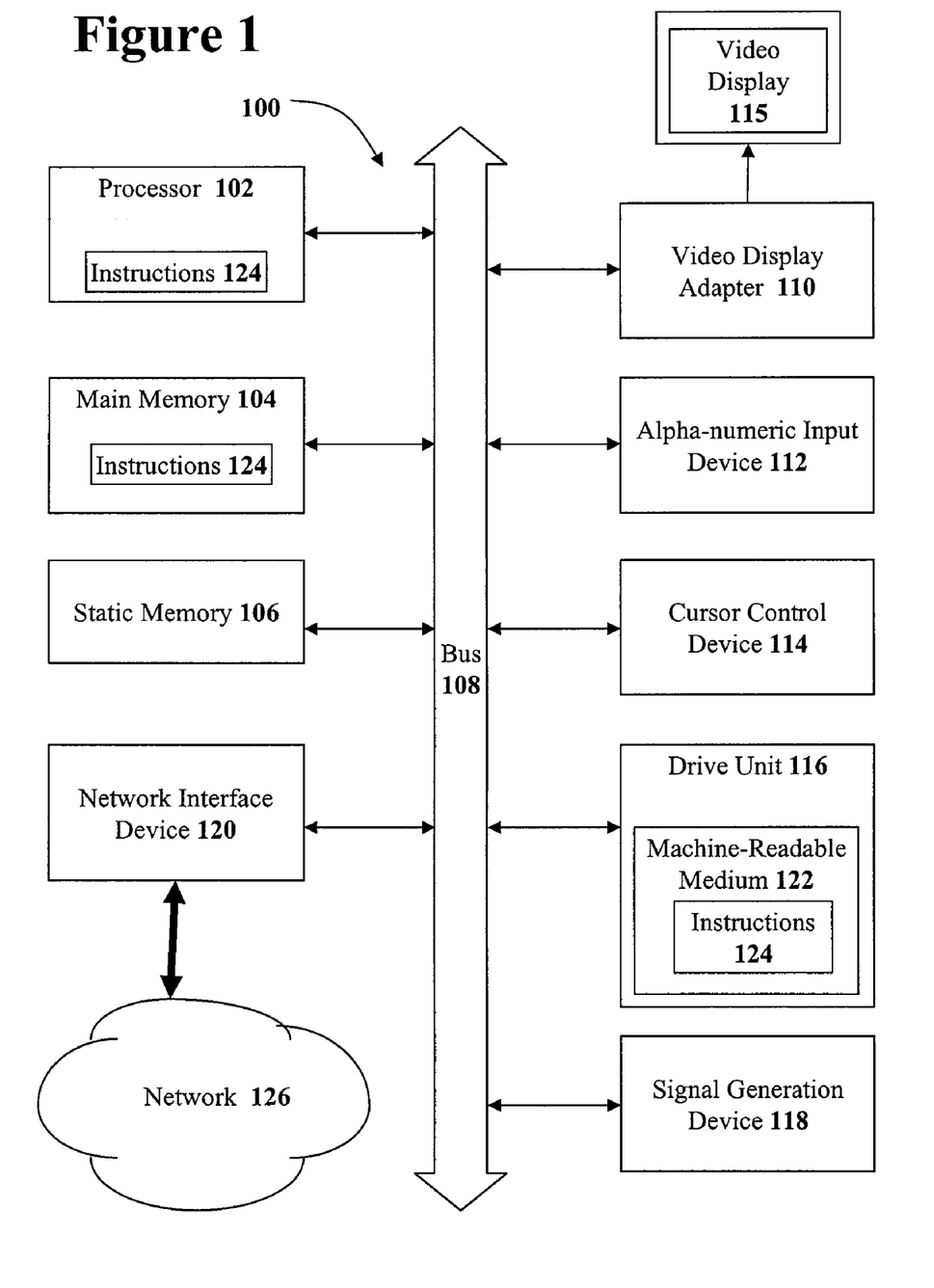
FIG. 1 illustrates a diagrammatic representation of a machine in the example form of a computer system, within which a set of instructions for causing the machine to perform any one or more of the methodologies discussed herein, may be executed.

The present disclosure concerns digital computer networks and computer systems. FIG. 1 illustrates a diagrammatic representation of a machine in the example form of a computer system 100 that may be used to implement portions of the present disclosure. Within computer system 100 of FIG. 1, there are a set of instructions 124 that may be executed for causing the machine to perform any one or more of the methodologies discussed within this document.

In a networked deployment, the machine of FIG. 1 may operate in the capacity of a server machine or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network server, a network router, a network switch, a network bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 of FIG. 1 includes a processor 102 (e.g., a central processing unit (CPU), a graphics processing unit (GPU) or both), a main memory 104 and a static memory 106, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120. Note that not all of these parts illustrated in FIG. 1 will be present in all embodiments. For example, a computer server system may not have a video display adapter 110 or video display system 115 if that server is controlled through the network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media.

The instructions 124 may further be transmitted or received over a computer network 126 via the network interface device 120. Such transmissions may occur utilizing any one of a number of well-known transfer protocols such as the well known File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

Digital Network Technology

The scheduling and delivery of data over digital network is a complex and multi-layered set of processes based on protocols that define the desired behavior of different types of data packets. While network layers are somewhat arbitrary, the international standard organization (ISO) developed a seven layer open systems interconnection (OSI) network abstraction. The OSI model layers, from bottom to top, are the physical, data-link, network, transport, session, presentation, and application layers. The global internet based upon the Transport Control Protocol and Internet Protocol (TCP/IP) maps onto some the OSI layer. In greater detail, the OSI layers are:

Physical layer—the lowest layer corresponding to the physical media being used to transmit data such as RJ45 cables or optical fiber. The physical layer defines such things as pins, voltage levels, cable specifications, and other physical attributes.

Data Link Layer—the lowest logical layer which defines the format of the data that is injected into the physical medium. The data link layer provides the functional and procedural means to transfer data between network entities and to detect and possibly correct errors that may occur in the Physical Layer. One commonly known data link layer is Ethernet which attempts to inject a packet of data into the medium during an idle period. If a collision is detected, then there is a retry mechanism.

Network layer—in many situations, data must be sent from one computer network to another computer network. The network layer handles addressing data packets and the routing of data packets across networks. The best-known example of a network layer is the Internet Protocol (IP) used by the global internet. The network layer manages the transfer of data packets one hop at a time, from a source system to ingress router, router to router, and from egress router to destination system.

Transport layer—until this layer, packets are normally sent on a "best effort" basis which means that the data may or may not arrive at the final destination. The Transport Layer provides transparent transfer of data between end users, providing reliable data transfer services to the upper layers. The Transport Layer controls the reliability of a given link through flow control, segmentation/desegmentation, and error control. The most well-known examples of transport layers are the Transmission Control Protocol (TCP) and User Datagram Protocol (UDP) used on the global internet. The next three higher network layers are not formally used by the global internet but may be used in various internet applications.

Session layer—The Session Layer controls the dialogues/connections (sessions) between computers. It establishes, manages and terminates the connections between the local and the remote application. A session layer is commonly implemented in application environments that use remote procedure calls (RPCs). The Transmission Control Protocol (TCP) of the global internet provides some of the features of a session layer.

Presentation layer—The Presentation Layer establishes a context between Application Layer entities, in which the higher-layer entities can use different syntax and semantics, as long as the Presentation Service understands both and the mapping between them. The presentation layer may be used to implement encryption between applications. Many internet applications do not use a presentation layer.

Application layer—The application layer is the protocol defined by a particular network application itself. Network applications of the same type (or various separate components of those network applications) communicate with each other using the same application protocol. Application layer functions typically include identifying communication partners, determining resource availability, synchronizing communication, and transferring data. Some examples of application layer protocols implemented on the global internet include the File Transfer Protocol (FTP) for transferring files, the Simple Mail Transfer Protocol (SMTP) for exchanging internet email messages, and the Hyper-Text Transfer Protocol (HTTP) for communication of Hyper-Text Mark-up Language web pages between web servers and web browsers. Countless other application protocols exist on the global internet for other types of network applications.

These various network protocol layers provide the basic mechanisms for data transfers within and across digital communication networks. As digital communication networks have become increasingly complex in order to deliver more data for demanding network applications, such as real-time video over non-real-time networks, new network protocols have been created. These network protocols handle synchronization for real-time data, data buffering for non-time-critical data delivery, and other new requirements. All of these network protocols use minimal feedback information to provide a delivery service.

Digital Network Improvements

The initial digital network protocols were generally not aware of the complexities of inter-networking with multiple types of application data, each with different requirements, being carried on the same digital network. Thus, early digital networks generally treated all data packets on the network equally. This equal treatment of every data packet provided unsatisfactory results since bulk file transfer data packets could interfere with data packets transmitted from a real-time telecommunication application (such as Voice over IP commonly known as VOIP). As a result, new network algorithms and technologies have been developed to handle situations beyond the scope of the early digital network protocols. For example, "Quality of Service" (QoS) systems were developed for handing packets on a non-equal basis on digital networks. Digital network Quality of Service systems generally operate by providing a defined level of reliability and timing for various different data packets carried on the digital network.

Quality of Service features are often not embedded within existing internet network protocols (although there exist specific exceptions such as ATM isochronous data delivery for specific kinds of bandwidth reservation). Instead, Quality of Service (QoS) features are often created from the combination of multiple algorithms including bandwidth shaping which sorts and allocates network bandwidth for different transport data packets such TCP, SCTP or UDP and many others. The advantage of using Quality of Service techniques is that, by appropriately marking and identifying different types of data packets, different priorities may be assigned to the management of these data packets within router queues. As a result, time-critical information (such as real-time communication application data packets) will be more likely to arrive on-time than if all data packets were treated equally.

If there is no congestion in a network then all data packets will be handled immediately. Quality of Service techniques start to be used when the traffic on the network begins to overload available network resources. (such as routing, link capacity, etc.). In such conditions, a Quality of Service system may prioritize certain traffic and reserve bandwidth for specific types of data packets. These actions come at the expense of lower priority data packets which may be delayed or dropped. Using Quality of Service bandwidth reservation techniques, specific amounts of bandwidth may be reserved for specific types of data packets. When applied to a particular network connection, an entire message of prioritized traffic may use the reserved bandwidth.

While Quality of Service techniques certainly help to optimize network bandwidth usage (i.e. the available throughput of the network at any given time) and prioritize network traffic, these quality of service techniques only focus on alleviating network congestion during times of peak demand. For example, quality of service systems may use algorithms such as the fair queuing algorithm and other techniques to allow many data packets to go through in the most optimal time. However, these same quality of service techniques can actually cause network traffic bottlenecks when bandwidth is reserved for one high priority type of data and not for another since the traffic flow of the latter data may increase in attempts to re-transmit dropped data packets.

Quality of Service techniques are generally static in nature. Specifically, the data packets are given a quality of service marking by the type of data using the preset policies of the network administrator. These quality of service markings are given to data packets without any regard to current network conditions. Thus, should the type of data traffic change significantly or should unusual traffic patterns form at certain periods of time, a network administrator would have to manually adjust the quality of service policy settings of the network at that time to change the behavior of the quality of service system. Furthermore, quality of service techniques are only designed to manage short term traffic overloads that may last milliseconds to a few seconds (and, perhaps, in rare instances, minutes).

Improving Network Efficiency Beyond Quality of Service

As set forth above, quality of service techniques are designed only to address short term network traffic overloads. However, there are other longer-term network traffic variations that cause inefficiencies within digital networks. These network traffic variations are long relative to the length of individual data packets or even to complete messages consisting of many related data packets. These longer-term types of network traffic variations cannot be handled by current quality of service techniques that are only designed to address short term network traffic patterns.

Computer networks tend to have both regularly occurring (periodic) and unexpected long-term network utilization patterns that may span minutes, hours, days, weeks, and even months. These variations in network traffic result in inefficiencies in network utilization. A typical example of an inefficiency in network utilization occurs at the so-called "last mile" or network edge delivery of data from an internet service provider (ISP) to the end user or consumer. Since most internet end users are human beings, the network usage of most internet end users follow human patterns of internet usage. For example, business internet users typically have heavier internet usage during the day and low use during the nighttime. Residential internet users may have heavier usage in evening hours and light usage during the day. Both residential and business internet users tend to have very light network traffic during the middle of the night. Even during the day, humans have cyclical behavioral patterns such as meal times and work schedules that cause network traffic to vary. Various internet users have identifiable cyclical usage patterns that may span months. For example, internet-based retailers tend to use much more internet capacity during holiday shopping season.

Mindful of the network inefficiencies due to these long-term network traffic variations, the present disclosure provides various techniques to take advantage of these long-term variations in network traffic. Specifically, the present disclosure introduces new types of delayed data requests, that can be implemented at a high network layer such as the application layer or at the transport layer. One type of proposed delayed data transfer request informs the network to schedule the data transfer at a time that is suitable to the network (presumably when network traffic is low). In some cases, the network has the option never to deliver the requested data due to persistent high traffic volume or other conditions.

In one embodiment, the delayed data request is implemented at a high protocol layer such as the application layer. In this manner, an entire file or data stream may be delayed or ignored safely. The User Datagram Protocol (UDP) provides a primitive version of a delayed data request. However the UDP protocol exist at the datagram level and thus does not provide sufficient information to encode rules of behavior for entire messages or for long periods of time. For example, UDP packets may be dropped by network routers if such network routers get overloaded. But in such a situation, the data sender (generally a computer server) and the data recipient (which may be a computer browser) must exchange out-of-band information (i.e. information not encoded within the UDP data packets themselves) to identify what information was lost. Even more limiting is that UDP does not provide for long-term intermediate storage of delayed requests or delayed data. In fact, UDP data packets are likely to be dropped within milliseconds under commonly occurring busy periods on a computer network.

A Simplified Embodiment

The techniques of the present disclosure may be implemented in many different ways. In various embodiments, methods for automatically managing data transfers across a network in a manner that is sensitive to and aware of the available network capacity were implemented. In some embodiments, a set of network protocols was designed with information that allows data packets and entire messages to be stored, delayed or destroyed over long periods of time many times greater than the message length itself and usable over periods of times relevant to human-scale network use variations.

To illustrate the basic operation of the system, a high-level simplified embodiment will be described. In the simplified embodiment, a proposed network protocol allows for two different types of delayed data transfers:

1) A first delayed data requests allows data to be sent whenever network traffic loads are sufficiently low, or
2) A second delayed data requests allows data to be sent whenever network traffic loads are sufficiently low, or if the network is too heavily loaded, then the data should not be sent at all.

The first delayed data transfer type (1) may be referred to as a delayed data transfer (DDT) that is created by a server in response to a delayed data transfer request (DDTR) from a client system. The second delayed data request type (2) may be referred to as a delay-or-drop data transfer (DoDT) that is created by a server in response to a delay-or-drop data transfer request (DoDTR) from a client system.

Initially, the utility of the delayed data transfer (DDT) or delay-or-drop data transfer (DoDT) may not be immediately apparent. Most computer network users wish to have the network requests they make acted upon immediately. However, the delayed data transfer (DDT) and delay-or-drop data transfer (DoDT) of the present disclosure allow the various components in a computer network to shift data transfers to a more convenient time for the computer network. In this manner, the computer network may optimize its efficiency by shifting data transfers to times when more network capacity is available.

There are several situations in which a delayed data transfer (DDT) and delay-or-drop data transfer (DoDT) may be used in a network without any adverse effects. For example, take a situation illustrated in FIG. 2 in which a network client device A 210 issues one or more data requests for files from a server host H 290 on a network 250. In most cases, the network device A 210 will desire to have the requested data as soon as possible. However, if network client device A 210 requesting the data is actually a data buffer that temporarily stores data in buffer 213 for another data processing device B 220 and network client device A 210 knows that data processing device B 220 is currently very busy processing other data, then network client device A 210 may elect to issue a delayed data transfer request (DDTR) or delay-or-drop data transfer request (DoDTR). In this situation, if the host server H 290 delays responding with the requested data there is no harm since data processing device B 220 is already busy processing other information. This type of situation may occur often in a "cloud computing" system wherein a remote system provides computer processing services to multiple clients.

Figure 2:
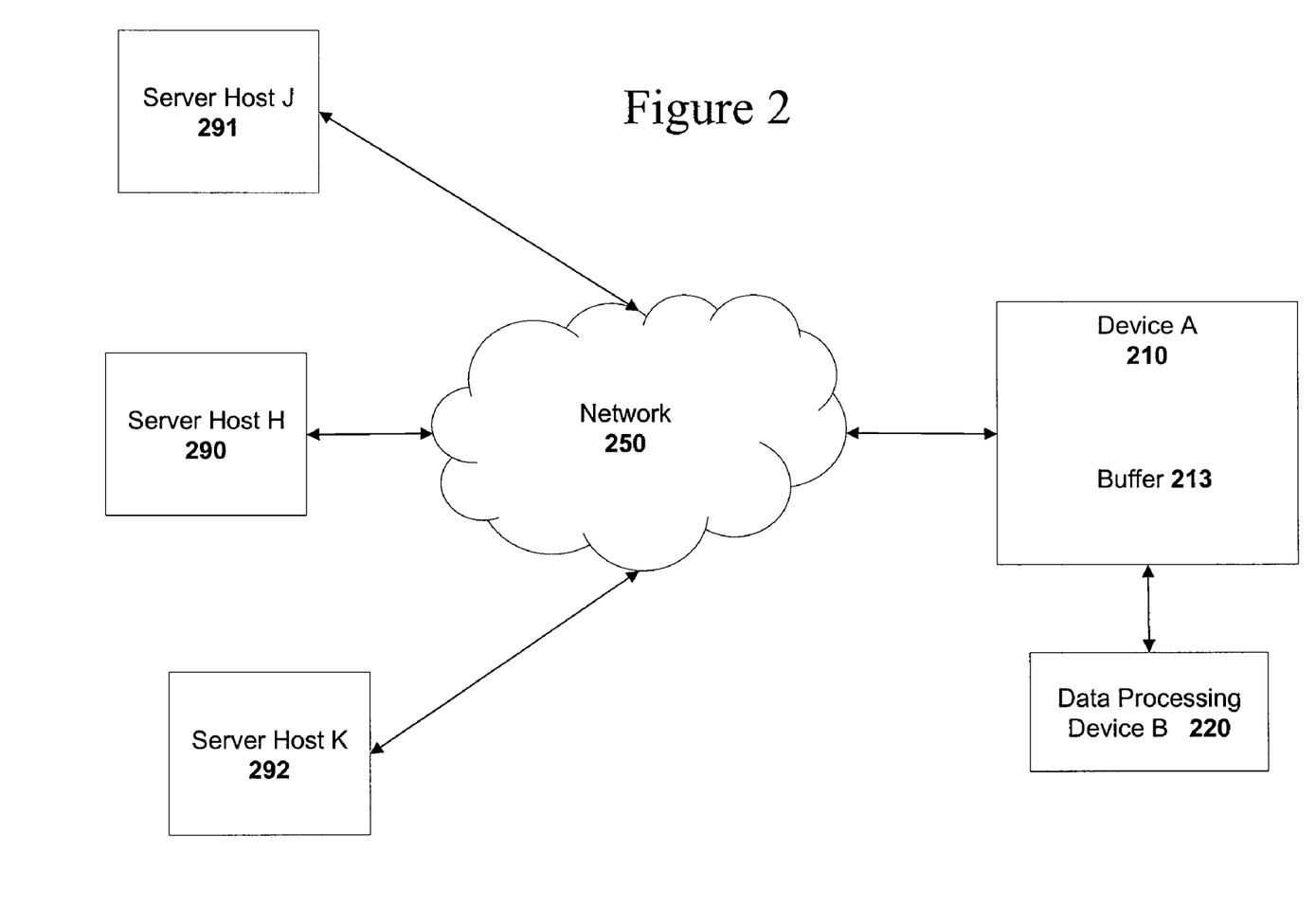
FIG. 2 illustrates an example situation wherein a delayed data transfer request would be useful.

In the specific case wherein data processing device B 220 must process numerous data packets for multiple clients (such as server host H 290, server host J 291, and server host K 292), data processing device B 220 will very often be busy working on data from another system (or higher priority data). In such systems, the buffer systems (such as network client device A 210) that retrieve data to provide to data processing device B 220 may elect to issue a delayed data transfer request (DDTR) or a delay-or-drop data transfer request (DoDTR) to the systems the provide data. The use of these delayed data transfer requests allows these providers of data to decide whether to respond immediately or to delay a response depending on the current network traffic conditions. In this manner, the providers of data that delay data responses during heavy traffic congestion on the network will be spreading these data transfers to less busy times. Thus, the use of these delayed data transfer requests will result in overall improved overall network bandwidth efficiency.

To implement a system that can handle delayed data transfers (DDT) and delay-or-drop data transfers (DoDT), various modifications must be made to some components of a network. Specifically, the network should have (1) at least one network traffic device that determines what the state of the network traffic is at any given time and that makes that information available; and (2) various servers, routers, proxy servers, or other network devices that are able to detect these lower priority delayed data transfer request (DDTR) and delay-or-drop data transfer request (DoDTR) messages and respond as appropriate to these lower priority requests in view of current network traffic.

The network traffic device that determines the state of the network traffic may collect traffic statistics from various sources, generate traffic reports, and make that information available to the servers. A network traffic device may be implemented as a process on a network host, within a network router, as a separate physical device on the network, or in any other suitable form. Fortunately, most computer networks already contain devices such as switches, routers, and servers that collect network traffic information and that can provide that information to other devices. A main network traffic device may collect this network traffic information, process this information to create network traffic reports, and make those network traffic reports available to other network entities. In other embodiments, various different network traffic devices may determine the network conditions for different parts of a network.

The servers in the network should be modified to take advantage of these network traffic reports. Each server should periodically request or automatically receive a network traffic report from the network traffic device. Furthermore, each server should be able to detect the delayed data transfer request (DDTR) and delay-or-drop data transfer request (DoDTR) messages and respond to these messages appropriately. Specifically, the servers will consult the most current network traffic information and make a determination if an immediate response to the request should be issued, if a delayed response to request should be scheduled, or if the request should be ignored. Note that not all network components need to be equipped to handle these new messages. However, the greater the percentage of network components that are so equipped, the more efficiently the network will be able to operate.

Figure 3:
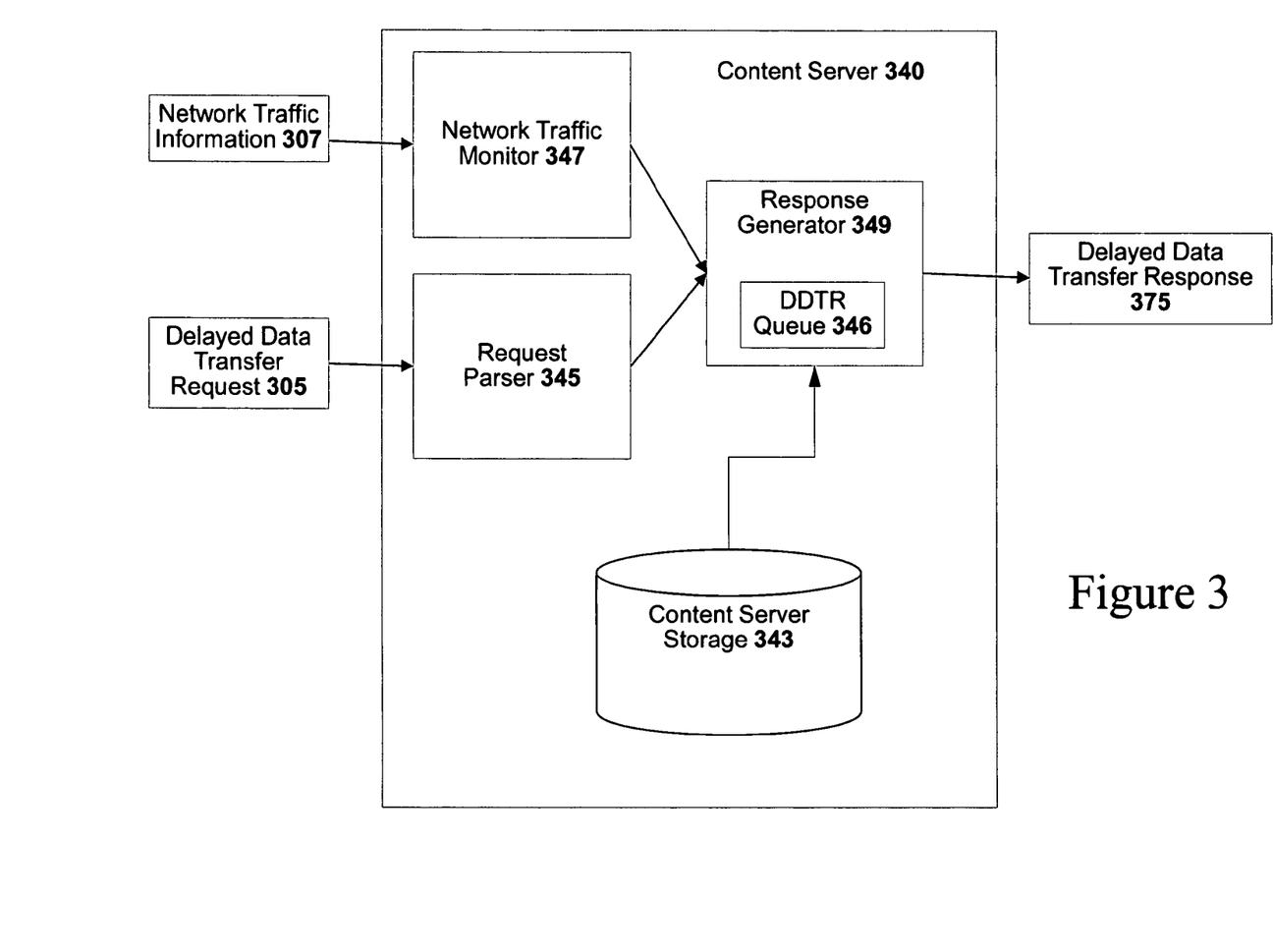
FIG. 3 illustrates a high level block diagram of a content server using teachings of the present disclosure.

FIG. 3 illustrates a high level block diagram of a server embodiment. The content server 340 has a network traffic monitor 347 that receives network traffic information 307 and generates an internal representation of current network traffic. The network traffic information 307 may be network traffic reports generated by a network traffic device elsewhere on the network, traffic information from nearby routers, or simply a counting of data packets seen on the local network connection. The content server 340 also has a request parser 345 that receives data requests such as delayed data transfer request 305. The request parser 345 will parse requests for the type of content that content server 340 handles. For example, if content server 340 is a web server then the request parser 345 will be able to handle HyperText Transfer Protocol (HTTP) requests. Similarly, the content server storage 343 contains the type of content that that content server 340 handles.

When content server 340 receives a delayed data transfer request 305, that delayed data transfer request 305 will be processed by request parser 345. Request parser 345 will pass a decoded request to response generator 349. Response generator 349 will consider the current network traffic conditions (and possibly the current content server 340 processing load condition) and respond to the decoded request as appropriate. For example, if there is little network traffic and processing load, the response generator 349 will immediately create a delayed data response 375.

In some embodiments, a server may begin responding to a delayed data transfer request (DDTR) or delay-or-drop data transfer request (DoDTR) but then cease responding before the entire response message is sent. This may occur due to a sudden increase in network traffic. In such situations, the requesting client should save whatever segments of the response massage were successfully transmitted and only request the missing parts of the message at a later time when there is capacity for more low-priority data.

Other than the reduction of network traffic at critical times, the usefulness of the delay-or-drop data transfers (DoDT) may not seem immediately apparent. Specifically, under what conditions would it be acceptable to a requesting client if the low priority data request was delayed for a long time or never fulfilled at all? There happen to be many situations where this is acceptable to a requesting client but the following paragraphs will describe a couple important cases. In general, a delay-or-drop data transfer request (DoDTR) should be considered whenever a client system can issue a data request significantly ahead of the time that the data is expected to be used.

One specific case that may use a delay-or-drop data transfer request (DoDTR) is when a particular device is attempting trying to predict what data will be needed in future and fetch that predicted data before it is needed. This is commonly known as a predictive cache fetch operation. Such operations are only trying to optimize some performance metric and thus are not required to occur. If the server responds to such a predictive cache fetch request with a delay-or-drop data transfer (DoDT) response containing the predicted data then the client can put that data in a cache such that the client will have that data ready in case the client system receives a request for that data. If a server does not respond to the DoDTR that was a predictive cache fetch then the cache of the client system will not be filled with the requested data. Thus, if the cache in the client system later actually receives a request for the data that was never there then the cache will send out a normal data request to the server for that data to obtain the requested data. This case is exactly as though the predictive cache did not exist which means that there is a cache miss. However, the client system will keep operating as normal by issuing the standard data request at the time the data is actually needed. Note that if the predictive cache never receives a request for that predicted data that was not delivered then no harm is done.

Another specific case that may use the delay-or-drop data transfer request (DoDTR) could be when a data transfer is scheduled for a specific time (such as night time) on the expectation that the network will be lightly loaded at that time. A regularly scheduled data transfer could be considered a 'subscription' to that data. If the network is unusually or unpredictably heavily loaded at the scheduled transfer time, then the server of the data may decide to ignore the request. If the requested data never arrives, the client that made the subscription data request will be detect that the requested data is missing at the time that the data is really needed and thus issue a normal data request for the missing data. In such a case, the consumer of the data must wait for a short period of time since because the needed data is not immediately available. However, the needed data will quickly become available as the data downloads or streams normally in response to the normal data request. Furthermore, note that the average network performance would have been optimized since the scheduled data transfer was not performed at time of significant network traffic.

The most important advantage of delayed data transfers (DDTs) and delay-or-drop data transfers (DoDTs) is that when a particular data requester truly does not urgently need the requested data, the DDTs and DoDTs allow the various nodes on the network to schedule the optimal time for these data transfers to occur (or to drop these packets if there is too much traffic). With existing network systems, a network will always seek to fulfill all data requests as soon as possible using a variety of techniques such as the previously mentioned fair queuing algorithm and other QoS techniques. If there is too much traffic, then the network will be forced to dropped packets such that users of the service will be unhappy. And furthermore, those dropped packet must be retransmitted such that network traffic is increased and network efficiency suffers. With the delayed data transfers, some of the network traffic may be delayed (time-shifted) such that network traffic may be better spread out across time.

Using the techniques of the present disclosure, the network has the data requesters and data servers provide additional information (such as network traffic information and data request urgency information) in order to prioritize the various data requests. With this added information and with the collaboration of the data requesters and data servers on the network, the network then has a new and important tool to automatically redistribute data requests over time in order to optimize the usage the available network bandwidth. Note that many network components along a long request/response packet route make take advantage of this system to improve network performance.

A First World Wide Web Application Embodiment

One of the most popular applications on the global internet is the World Wide Web (WWW). The WWW allows internet users with web browsers to contact web servers in order to access and view web pages filled with multi-media and formatted in a Hyper-Text Mark-up Language (HTML). The web browsers and web servers communicate in an application protocol known as Hyper-Text Transport Protocol (HTTP). In one embodiment of the present disclosure, a modified protocol based on Hyper-Text Transport Protocol (HTTP) was designed to optimize network performance. Note that this example described with reference to HTTP is only one network application of the many that may be modified to use the teachings of the present disclosure. Many different application protocols such as FTP, SMTP, custom distributed computing protocols, and others may be modified in a similar manner to further improve network performance.

The normal Hyper-Text Transport Protocol (HTTP) uses a request/response process to exchange information between a web client and web server. The request/response process of the Hyper-Text Transport Protocol (HTTP) was modified to include a delayed data transfer request (DDTR) type and a delay-or-drop data transfer request (DoDTR) type. Specifically, HTTP messages are modified with several HTTP headers that provide for long-term delays in data transfers and for complete message drops. The extended version the Hyper-Text Transport Protocol (HTTP) extends normal HTTP in the following ways:

(1) The HTTP request messages are tagged with an additional optional header to indicate the protocol extension. In HTTP, an X-extension may be used such as an "X-tomnica-prefetch:" header. The added X-header may specify if the request is a data transfer request (DDTR) or a delay-or-drop data transfer request (DoDTR). Note that using the optional X-header of the HTTP protocol allows the modified protocol to be backwards compatible with existing web servers since existing web servers will ignore the added extension and respond to the requests as ordinary HTTP requests.

(2) The HTTP requests and responses may be tagged with low priority quality of service (QOS) indicators. For example, the DiffServ, ECN, Traffic Class, and/or Flow Label bits on a data packet may be set as appropriate to indicate low priority. In this manner, a web publisher's router (and any other downstream routers using the same QOS features) will treat these packets as low priority packets that may be delayed or dropped if traffic congestion is encountered.

(3) A special HTTP reply message may be used when a web publisher is too busy to process low priority requests (such as predictive downloads). The response message may contain a response status code that indicates the server is busy and when the requester should try again to fetch this data. Such a response code may be implemented in a number of different ways. For example, a new HTTP status code may be created for this feature. In other embodiments, an additional code may be added to an existing response code. For example, an additional extension may be added to a response message that uses Microsoft's 449 "retry with" extension or the 509 "bandwidth limit exceeded" response.

With these slight modifications, the HTTP protocol has been modified in manner that will allow the network optimization system of the present disclosure to operate. To fully describe the system, an example of a delayed data transfer will be presented from request to delivery.

Figure 4:
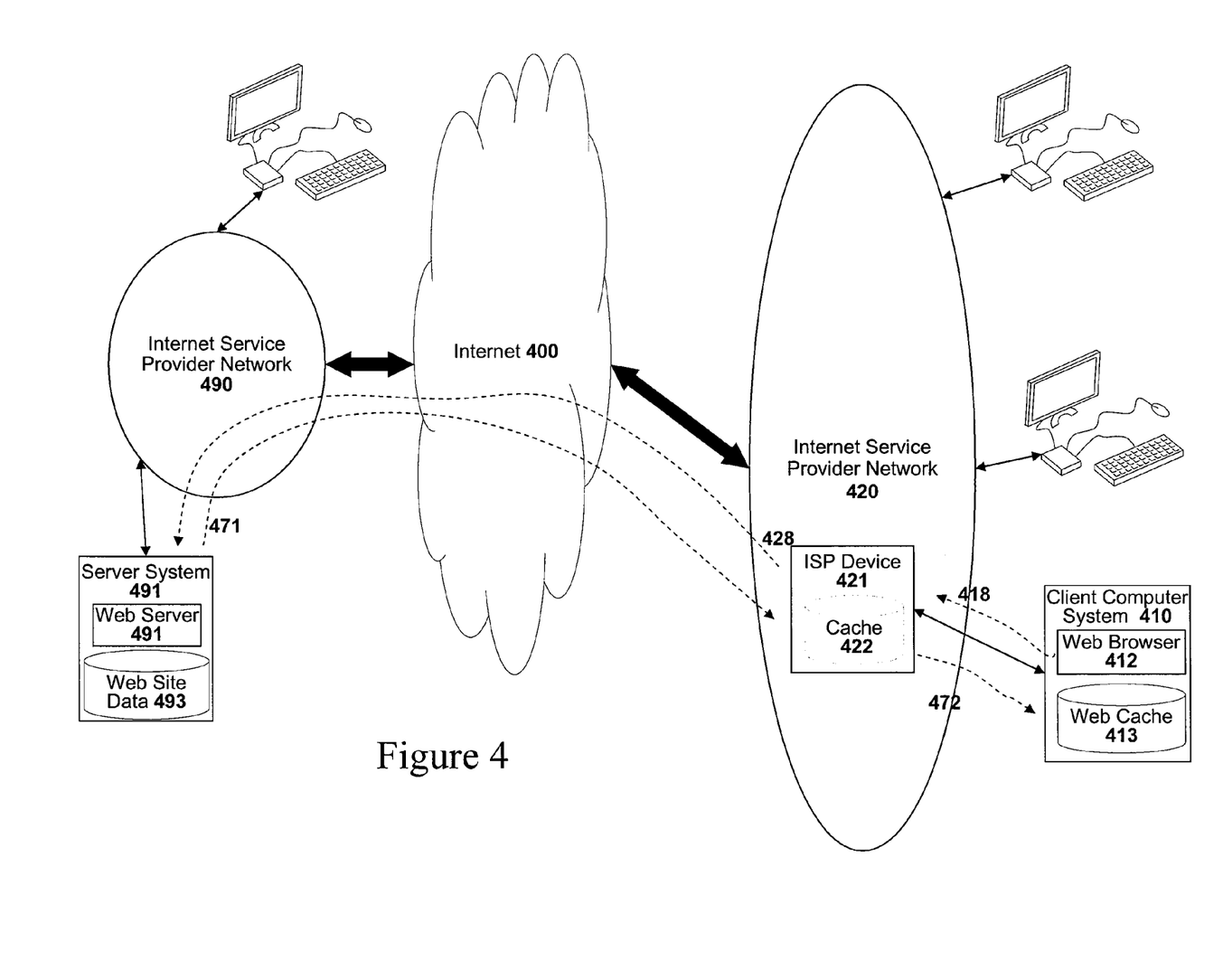
FIG. 4 illustrates the data flow of a delayed data transfer request from a requesting client system to a server system and the response from the server system back to the requesting client system.

FIG. 4 depicts high-level network illustration that implements one embodiment of the teachings in the present disclosure. Client computer system 410 contains a web browser 412 that has been modified to work with the extended HTTP protocol. The user of client computer system 410 may be a dedicated sports fan that always accesses a certain sports news web server 491 after coming home from work. To optimize for network efficiency, the modified web browser 412 in client computer system 410 may be programmed always to issue a delayed data transfer request (DDTR) 418 to obtain various web pages from the web site database 493 of the sports news web site server 491 a couple of hours before the sports fan returns home from work. In this manner, the web cache 413 of the modified web browser 412 will already be filled with sports news information for the sports fan.

In one embodiment, the modified web browser 412 may issue a request for permission to send a delayed data transfer request (DDTR) 418 before actually sending a DDTR 418. This request for permission will be addressed to network device near the edge of the network such as a concentrator that aggregates multiple client system communications onto a single larger data link. If the network device determines that the network is currently too busy, the network device may send a response back to the client computer system 410 rejecting permission at this time. The rejection message may include information that suggests when the client computer system 410 may try again. If the network device determines that the network is no too busy then the network device may send a response back to client computer system 410 authorizing that a DDTR 418 may be sent.

After the modified web browser 412 issues DDTR 418, the DDTR 418 will be received by some device at the Internet Service Provider 420 used by the sports fan. In this example, ISP device 421 receives DDTR 418. If the Internet Service Provider network 420 is extremely busy at the time, then ISP device 421 may immediately drop the DDTR 418 immediately due to the low priority Quality of Service status of the data packets carrying the DDTR 418 request.

If the Internet Service Provider network 420 is not too busy, then ISP device 421 will handle the DDTR 418. If the ISP device 421 is not familiar with this type of delayed request, the ISP device 421 (such as a router) may just forward the data packet as any other data packet. If the ISP device 421 is familiar with this type of delayed request, the ISP device 421 may take current network conditions in consideration when determining how to handle the DDTR 418.

Note that various devices along the path of a DDTR 418 to its final destination server may or may not be familiar with the specialized delayed data transfer type of request. The more devices that are familiar with the DDTR type of request, the more benefits will be gained. If only the client system (such as a PC or cellular phone) that issued the DDTR is familiar with the new protocol is then only that client system gets the benefit of the predictive download (at the possible expense of added traffic to both network provider and the server that receives the request. If the client and the various nodes along the path of the DDTR are both aware of the new protocol then the client system benefits from the predictive download and the network provider benefits because the nodes on the network can properly schedule the DDTR at periods of low network traffic (and delay or drop such requests during high traffic). However, the destination content server will receive significantly more requests which that server will treat as normal data request. If all three actors (the client, intermediary network nodes, and the server) are aware of the new protocol, then all three actors will receive benefits. The client and network receive benefits as set forth above and the content server receives the benefit of being able to decide on how much delayed data transfer request traffic the server wishes to handle based on its current load, network conditions, or other factors.

Referring back to the ISP device 421 that has received a DDTR 418, if the ISP device 421 is familiar with this type of delayed transfer request then the ISP device 421 may examine the DDTR 418 and determine how the DDTR 418 should be handled. If the ISP device 421 determines that the communication links to the sports news web server 491 are currently too busy, then the ISP device 421 may send a response back to the modified web browser 412 indicating that it is too busy and that the request should be submitted again. Alternatively, the ISP device 421 may queue the DDTR 418 until traffic along the communication link to the sports news web site server 491 is reduced and then pass the DDTR along to sports news web server 491 at a later time. In another embodiment, ISP device 421 will simply drop the DDTR 418 if the network traffic is too heavy. The client that issued the DDTR 418 will eventually timeout and reissue at some future time.

If the ISP device 421 determined that links to the sports news web server 491 were not too busy (or the ISP device 421 waited until that those links were not busy) then ISP device 421 passes the DDTR 428 along to the sports news web server 491. Note that due to the low priority QOS settings on the packets of the DDTR 428, the DDTR 428 may be dropped by any network router along the path while on its way to the sports news web site server 491.

If the sports news web server 491 receives the DDTR 428 and the sports news web server 491 is not aware of the extended HTTP protocol with delayed requests, then the sports news web site server 491 will respond to the DDTR 428 as a normal HTTP request. Thus, the sports news web server 491 will respond with a normal response back to the client computer system 410.

If the sports news web site server 491 receives the DDTR 428 and recognizes the added header extension, then the sports news web site server 491 may respond in several different ways. If there is no significant traffic on the network 490 around the sports news web server 491 then the sports news web server 491 may respond to the request immediately like a normal HTTP request. However, if there is traffic on the network 490 around the sports news web server 491 then the sports news web server 491 may opt to queue the delayed data transfer request and handle the request at a later time. In some embodiments, the sports news web server 491 may send a quick response indicating that that the server is too busy and cannot currently respond. The quick response may contain a time as to when another request should be attempted. In some embodiments, the sports news web server 491 may just drop the request such that the client that sent the request will never receive a response. In the case that the server simply drops the request, the client that issued the request will eventually timeout waiting for the reply and will reissue the request at a later time (or perhaps never if the network is always too busy).

The data transfer response 471 (whether delayed or not) from sports news web server 491 will pass through systems of the Internet service provider 420 used by computer system 410 of the sports fan. One of the systems at ISP 420 may handle a web cache 422 operated by ISP 420 or by a third party which manages the web cache 422 within the ISP 420 facility. For example, ISP device 421 may handle web cache 422. In such circumstances, the ISP device 421 may make a determination as to whether the information in the data in data transfer response 471 is likely to be requested by other customers of ISP 420. If so, the ISP device 421 stores a copy of the information in the response in web cache 422 to respond to any other customers that request the same web page (or web pages) in data transfer response 471. The data transfer response will be passed along to client computer system 410 as data transfer response 472.

Upon receiving a response 472, the modified web browser 412 on client computer system 410 will store the requested web page (or web pages) into a local web cache 413. When the sports fan comes home, the sports fan may then attempt to access the fan's sports news web site server 491. Assuming the client computer system 410 eventually received a data transfer response 472 in response to the delayed data transfer request, the modified web browser 412 will then immediately serve the web page data from the local cache 413 in client computer system 410. Due to the very fast response (since the web pages are already in the local cache 413), the sports fan will be very satisfied with the internet service provided by ISP 420.

Note that in addition to the sports fan being satisfied, the providers of network service along the route may be helped by such requests. For example, the performance of the network of ISP 420 will be improved due to the flexibility of being able to drop or delay the delayed data transfer request (DDTR 418) if necessary. Furthermore, even the network of the ISP 490 that handles the internet traffic for sports news web server 491 will have improved performance due to the ability to drop DDTR 428 or delay responding to the DDTR 428 to a time when there is less traffic on the network of ISP 490. Thus, the disclosed system is capable of providing benefits to every party involved in the accessing of a web site: the end-user, the ISP of the end-user, and the ISP of the web site accessed by the end-user.

A Second World Wide Web Application Embodiment

In an alternate embodiment, the HTTP protocol is modified into a new protocol called HyperText Transport Protocol Delayed or HTTPD. The modifications are implemented by using the 'method token' of the HTTP protocol. The method token indicates the method to be performed on the resource (server) identified by the request. In HTTP, the method token is defined as follows:

Method="OPTIONS"|"GET"|"HEAD"|"POST"|"PUT"|"DELETE"|"TRACE"|"CONNECT"| extension-method where extension-method=additional tokens created for HTTPD For HTTPD, the extension-method is used to create a set of new methods such as DGET (Delayed GET), DHEAD (Delayed HEAD), DPUT (Delayed PUT) that are sufficient to create request messages for DDTRs and DDTs. DoDTRs and DoDTs are handled with these same methods but will have different header information to indicate the drop option.

To interoperate with older systems that do not understand the HTTPD protocol, a proxy may be used. For example, a client system might issue a DGET for a delayed data request. An intermediary proxy would receive the DGET and issue a standard GET that will be received by the destination server. The proxy would receive a PUT message from the server and translate that into a DPUT for the client system. The proxy may delay the issuance of the translated DGET or PUT messages depending on network traffic. This case is particularly important when setting up a proxy on an edge server on an internet service provider's network. In these cases, the internal backbone may be able to handle the traffic but the last mile near the client system may be saturated.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim is still deemed to fall within the scope of that claim.

Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method of communicating information on a data network, said method comprising:
   receiving a delayed data request for an identified data object, said delayed data request including a first application layer protocol message marked to indicate that said delayed data request may be delayed until network traffic loads are sufficiently low;
   accessing said network traffic loads;
   immediately handling said delayed data request when said network traffic loads are sufficiently low;
   delaying handling said delayed data request when said network traffic loads are not sufficiently low;
   receiving a standard data request including a second application layer protocol message of the same application layer protocol as said first application layer protocol message, said second application layer protocol message being unmarked to indicate that said standard data request is to be handled in a standard manner; and
   handling said standard data request in said standard manner.

2. The method of communicating information on a data network as set forth in claim 1 wherein accessing said network traffic loads comprises receiving a network traffic report or collecting network traffic information and generating said network traffic report.

3. The method of communicating information on a data network as set forth in claim 1 and wherein said first application layer protocol message is further marked to indicate said delayed data request may be dropped, said method further comprising:
   responding to said delayed data request by discarding said delayed data request when network traffic loads are high.

4. The method of communicating information on a data network as set forth in claim 1 wherein delaying handling said delayed data request transfer of said identified data object comprises putting said delayed data request in a queue and handling said delayed data request comprises sending said delayed data request to a next network node along a path to a network server having said identified data object.

5. The method of communicating information on a data network as set forth in claim 1 wherein handling said delayed data request comprises sending a response containing said identified data object and said response containing said identified data object is cached by a network node along a path to a sender of said delayed data request.

6. The method of communicating information on a data network as set forth in claim 1 wherein handling said delayed data request comprises sending a response containing said identified data object and said response containing said identified data object is delayed by a network node along a path to a sender of said delayed data request if said network node detects network traffic.

7. The method of communicating information on a data network as set forth in claim 1 wherein said first application layer protocol message comprises a hypertext transfer protocol (HTTP) message, a file transfer protocol (FTP) message, or a simple mail transfer protocol (SMTP) message.

8. The method of communicating information on a data network as set forth in claim 7 wherein said HTTP message is tagged with an optional header or a method token to indicate said delayed data request may be delayed.

9. The method of communicating information on a data network as set forth in claim 7 wherein said delayed data request includes an Internet layer packet encapsulating said first application layer message, said Internet layer packet being tagged with one or more low priority QoS indicators.

10. The method of communicating information on a data network as set forth in claim 9 wherein said Internet layer packet is an IP packet and said one or more low QoS indicators are selected from the group consisting of a Traffic Class bit and a Flow Label bit.

11. A network device coupled to a data network, said network device comprising:
    a network traffic monitor, said network traffic monitor for determining network traffic loads; and
    a request handler, said request handler receiving a delayed data request for an identified data object, said delayed data request including a first application layer protocol message marked to indicate said delayed data request may be delayed until said network traffic loads are sufficiently low, said request handler immediately handling said delayed data request when said set of network traffic loads is sufficiently low else delaying a handling of said delayed data request when said network traffic loads are not sufficiently low, said request handler receiving a standard data request including a second application layer protocol message of the same application layer protocol as said first application layer protocol message, said second application layer protocol message being unmarked to indicate that said standard data request is to be handled in a standard manner, said request handler handling said standard data request in said standard manner.

12. The network device as set forth in claim 11 wherein said network traffic monitor receives a network traffic report from a network traffic device on said data network or collects network traffic information and generates said network traffic report.

13. The network device as set forth in claim 11 wherein said first application layer protocol message is further marked to indicate said delayed data request may be dropped and said request handler discards said delayed data request when said set of network traffic loads are high.

14. The network device as set forth in claim 11 wherein delaying handling of said delayed data request comprises putting said delayed data request in a queue and handling said delayed data request comprises sending said delayed data request to a next network node along a path to a network server having said identified data object.

15. The network device as set forth in claim 11 wherein handling said delayed data request comprises sending a response containing said identified data object and said response containing said identified data object is cached by a network node along a path to a sender of said delayed data request.

16. The network device as set forth in claim 11 wherein handling said delayed data request comprises sending a response containing said identified data object and said response containing said identified data object is delayed by a network node along a path to a sender of said delayed data request if said network node detects network traffic.

17. The network device as set forth in claim 11 wherein said first application layer protocol message comprises a HTTP message, a FTP message, or a SMTP message.

18. The network device as set forth in claim 17 wherein said HTTP message is tagged with an optional header or a method token to indicate said delayed data request may be delayed.

19. The network device as set forth in claim 17 wherein said delayed data request includes an Internet layer packet encapsulating said first application layer message, said Internet layer packet being tagged with one or more low priority QoS indicators.

20. The network device as set forth in claim 19 wherein said Internet layer packet is an IP packet and said one or more low QoS indicators are selected from the group consisting of a Traffic Class bit and a Flow Label bit.

* * * * *